United States Patent
Zlotin et al.

[11] 3,929,008
[45] Dec. 30, 1975

[54] APPARATUS FOR MEASURING AMPLITUDE OF VIBRATION OF ROTATING MACHINE PARTS

[76] Inventors: Boris Nikolaevich Zlotin, ulitsa Degtyarnaya, 12, kv. 8; Valentin Vyacheslavovich Timofeev, ulitsa Ordzhonikidze, 33, kv. 75; Sergei Vladimirovich Chernenko, prospekt Geroev, 43, kv. 35, all of Leningrad, U.S.S.R.

[22] Filed: Dec. 31, 1974
[21] Appl. No.: 537,707

[52] U.S. Cl. .................................. 73/71.4; 73/70.1
[51] Int. Cl.² .................................. G01H 11/00
[58] Field of Search .......................... 73/70.1, 71.4

[56] References Cited
UNITED STATES PATENTS

| | | |
|---|---|---|
| 2,208,648 | 7/1940 | Schrader .............................. 73/70.1 |
| 2,634,604 | 4/1953 | Hope .............................. 73/70.1 X |
| 3,058,339 | 10/1962 | Shapiro .............................. 73/71.4 |
| 3,654,803 | 4/1972 | Robinson .............................. 73/71.4 |

FOREIGN PATENTS OR APPLICATIONS

| | | |
|---|---|---|
| 160,886 | 12/1962 | U.S.S.R. .............................. 73/71.4 |
| 224,865 | 5/1969 | U.S.S.R. .............................. 73/71.4 |

*Primary Examiner*—Richard C. Queisser
*Assistant Examiner*—John P. Beauchamp
*Attorney, Agent, or Firm*—Holman & Stern

[57] ABSTRACT

An apparatus is disclosed for measuring the amplitude of vibration of rotating machine parts to be used where it is required to measure vibration independently of the rotational speed of the machine shaft. The apparatus comprises a converter for converting pulse frequency into a signal proportional thereto, having its output connected to the inputs of a horizontal scanning unit, a vertical scanning unit and a pulse delay unit at the output of a pulse former. These units each comprise a sawtooth generator with a controlled rise time for the sawtooth signal and are electrically coupled to pulse sensors mounted opposite to corresponding marks on the machine shaft.

1 Claim, 4 Drawing Figures

APPARATUS FOR MEASURING AMPLITUDE OF VIBRATION OF ROTATING MACHINE PARTS

FIELD OF THE INVENTION

The invention relates to the field of measurements and investigation of vibration, and more particularly, to an apparatus for measuring the amplitude of vibration of rotating machine parts.

BACKGROUND OF THE INVENTION

The prior art includes apparatus for measuring the amplitude of vibration of rotating machine parts either on the basis of tensimetry or by contactless methods.

However, apparatus for measuring amplitude of vibration of rotating machine parts on the basis of tensimetry have certain basic disadvantages associated with the necessity of placing sensors directly on the rotating machine parts and receiving information from these sensors directly during the rotation. They are characterized by a short service life, complicated replacement and high cost of sensors. In addition, the impossibility of simultaneous by testing all of the rotating parts precludes a wide application of such methods.

The prior art includes apparatus for measuring amplitude of vibration of rotating machine parts based on the contactless method of measurement, which is free from the abovementioned disadvantages.

This prior art apparatus employing the contactless method for measuring the amplitude of vibration of rotating machine parts is constructed as follows. There is provided, on the stator of the machine opposite to a mark of the machine shaft, a first pulse sensor sensing the mark of the machine shaft, having its output electrically coupled via a series circuit including a first pulse former for appropriately shaping the sensor pulses and a horizontal scanning unit, to horizontal-deflection plates of a cathode-ray tube. A second pulse sensor is mounted opposite to the marks of the shaft disposed in the same plane with the rotating machine parts when the latter do not vibrate, the number of the marks corresponding to the number of the rotating machine parts. This second sensor senses these marks and has its output electrically coupled, via a series circuit including a second pulse former for appropriately shaping the sensor pulses, a pulse delay unit at the pulse former output and a vertical scanning unit, to vertical-deflection plates of the cathode-ray tube. A third pulse sensor is mounted opposite to the rotating machine parts and senses the rotating machine parts, this sensor having its output electrically coupled, via a third pulse former for appropriately shaping pulses from the sensor, to the control electrode of the cathode-ray tube. The tube has a screen on which there is formed a scan pattern consisting of vertical lines whose number corresponds to the number of the rotating machine parts being tested. A spot is displayed in each line which is defined by the instant of passage of a respective one of the rotating machine parts by the third pulse sensor, the spot displaying a line in case a vibration exists, having a length line length proportional to the amplitude of vibration of a given rotating part.

The main disadvantage of this prior art apparatus which employs the contactless method for measuring the amplitude of vibration of rotating machine parts consists in its failing to provide for the measurement of amplitude of vibration of rotating machine parts under fluctuations of the rotational speed of the shaft. This obtains since the operation of both the pulse delay unit at the output of the pulse former and the horizontal and vertical scanning units does not depend on the rotational speed of the shaft. This failure of the prior art contactless method results in an error limiting the accuracy of measurements even with small deviations of the rotational speed. Indeed with greater rotational speed deviations occurring in actual operation, the error is such that the resulting measurements are of no practical value.

The prior art apparatus is also deficient in that it reuires complicated maintenance and operation.

OBJECTS OF THE INVENTION

It is an object of the invention to provide an apparatus which permits the accurate measurements of the amplitude of vibration of rotating machine parts under fluctuations of the rotational speed of the machine shaft.

Another object of the invention is to provide an apparatus for measuring amplitude of vibration of rotating machine parts, which is simple in maintenance and operation.

SUMMARY OF THE INVENTION

In accordance with these and other objects, the invention comprises an apparatus for measuring the amplitude of vibration of rotating machine parts, including a first pulse former mounted on the stator of the machine opposite to a mark of the machine shaft, this sensor sensing the mark of the machine shaft and having its output which electrically coupled, via a series circuit including a first pulse former for appropriately shaping the sensor pulses, and a horizontal scanning unit, to horizontal-deflection plates of a cathode-ray tube. A second pulse sensor is mounted opposite to marks of the machine shaft disposed in the same plane with the rotating parts when the latter do not vibrate, the number of the marks corresponding to the number of the rotating machine parts. The second sensor senses these marks and has an output electrically coupled, via a series circuit including a second pulse former for appropriately shaping the sensor pulses, a pulse delay unit at the output of the pulse former and a vertical scanning unit, to vertical-deflection plates of the cathode-ray tube. A third pulse sensor is mounted opposite to the rotating parts for sensing the rotating parts. This third sensor has an output electrically coupled, via a third pulse former for appropriately shaping the sensor pulses, to a control electrode of the cathode-ray tube. The cathode-ray tube has a screen on which there is formed a scan pattern consisting of vertical lines whose number corresponds to the number of the rotating parts being tested. A spot is displayed in each line which is defined by the instant of passage of a respective one of the rotating parts by the pulse sensor. The spot displays a line in case a vibration exists, the length of the line being proportional to the amplitude of vibration of a given rotating part. In accordance with the invention, there is provided a converter for converting pulse frequency into a signal proportional thereto having its input connected to the output of one of the pulse formers appropriately shaping the sensor pulses. The pulse delay unit at the output of the pulse former, the horizontal scanning unit and the vertical scanning unit each comprises a sawtooth generator with controlled rise time of the sawtooth signal, having their respective inputs connected to the output of the converter for converting pulse frequency into a signal proportional thereto.

The advantage of the apparatus according to the invention consists in providing the opportunity for measuring the amplitude of vibration of the rotating parts without regard for fluctuations of the rotational speed of the shaft. Additional advantages of the apparatus include a small weight and size, and its convenient maintenance and operation.

DESCRIPTION OF THE FIGURES

The invention will now be described with reference to a specific embodiment thereof illustrated in the accompanying drawings, in which.

DISCUSSION OF THE PREFERRED EMBODIMENT

Figure 1:
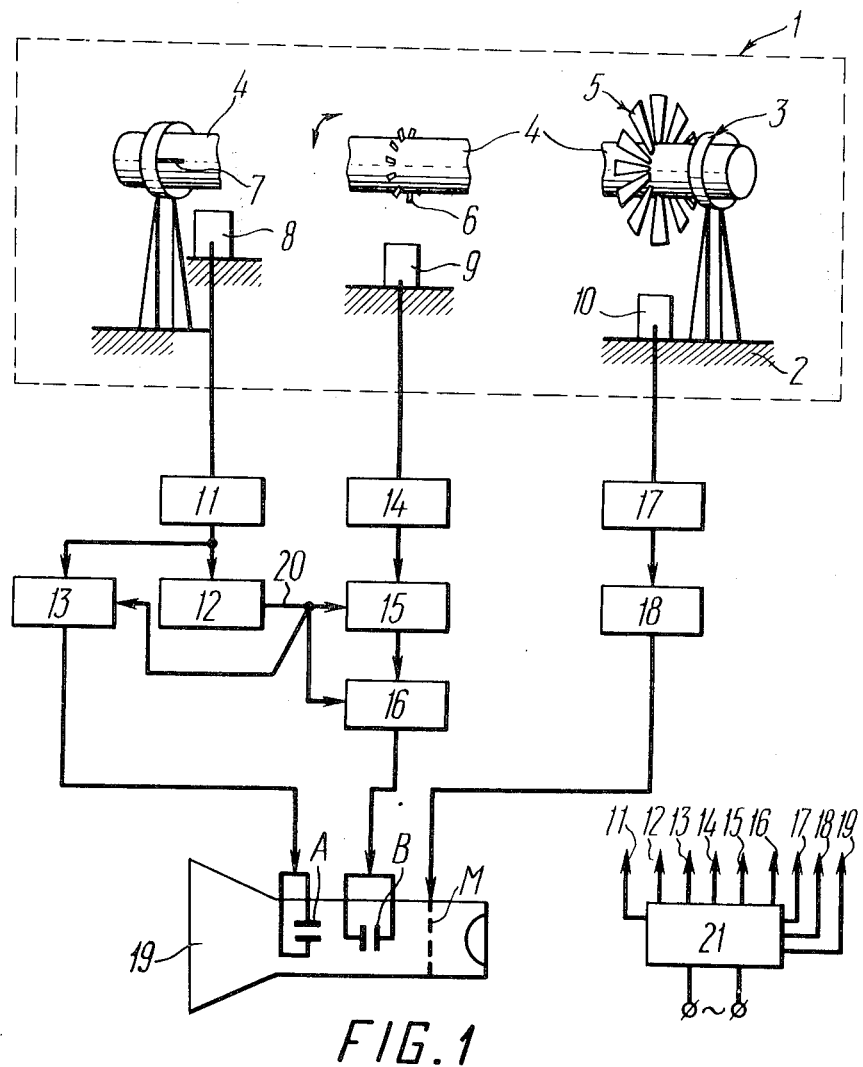
FIG. 1 shows a block diagram of an apparatus for measuring amplitude of vibration of rotating machine parts with a machine shaft according to the invention.

The apparatus for measuring amplitude of vibration of rotating machine parts according to the invention will be described as applied to the measurement of vibration of the vanes of a turbine 1 in FIG. 1, having a stator 2 coupled by means of bearings 3 with a shaft 4. Vibrating vanes 5, that is rotating parts of the turbine 1, are mounted on the shaft 4. The shaft 4 also mounts marks 6 fixed relative to the vibrating vanes 5 and a mark 7 of the shaft 4 of the turbine 1. A pulse sensor 8 sensing the mark 7 of the shaft 4 of the turbine 1 comprising a coil with a core (not shown) is mounted on the stator 2 opposite to the mark 7 of the shaft 4 of the turbine 1. A pulse sensor 9 sensing the marks 6 whose number corresponds to the number of the vanes 5 is also mounted on the stator 2 opposite to the marks 6 fixed relative to the vibrating vanes, the sensor 9 being constructed similarly to the sensor 8. A sensor 10 sensing the rotating parts is constructed similarly to the above-described sensors and is mounted on the stator 2 opposite to the vanes 5 of the turbine 1. The output of the sensor 8 is connected to the input of a pulse former 11 for appropriately shaping pulses from the sensor 8 having a known circuit configuration with the output connected to the input of a converter 12 for converting pulse frequency into a signal proportional thereto and to the input of a horizontal scanning unit 13. The output of the sensor 9 is connected to the input of a pulse former 14 for appropriately shaping pulses from the sensor 9 with an output connected to the input of a pulse delay unit 15 at the output of the pulse former 14. The output of the delay unit 15 is connected to the input of a vertical scanning unit 16. The output of the sensor 10 is connected to the input of a pulse former 17 for appropriately shaping pulses from the sensor 10 which is electrically coupled, via a known pulse converter 18 for converting pulses into short signals, to a control electrode M of a cathode-ray tube 19. The output of the converter 12 converting pulse frequency into a signal proportional thereto is connected, via a bus bar 20, to the control inputs of the units 13, 15, 16, and the outputs of the units 13 and 16 are connected to horizontal-deflection plates A and vertical-deflection plates B, respectively, of the cathode-ray tube 19. The input of the converter 12 for converting pulse frequency into a signal proportional thereto may alternately be connected either to the output of the pulse former 14 or to the output of the pulse former 17. A power supply unit 21 is connected to the pulse formers 11, 14, 17 units 13, 15, 16 converters 12, 18 and cathode-ray tube 19, respectively.

Figure 2:
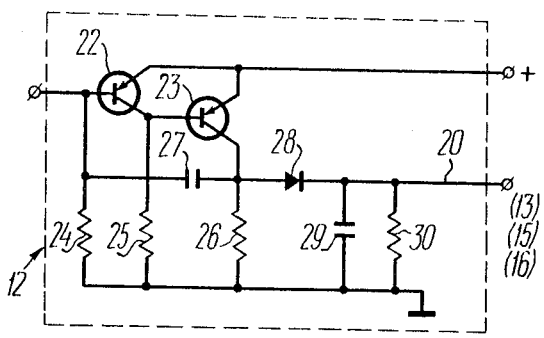
FIG. 2 is a principal diagram of a converter for converting pulse frequency into a signal proportional thereto, for use in an apparatus for measuring amplitude of vibration of rotating machine parts according to the invention.

The converter 12 for converting pulse frequency into a signal proportional thereto is shown in FIG. 2 and comprises a known circuit of a univibrator including transistors 22, 23, resistors 24, 25, 26 and a capacitor 27, the univibrator being coupled, via a diode 28, to an integrating circuit consisting of a storage capacitor 29 and a resistor 30.

Figure 3:
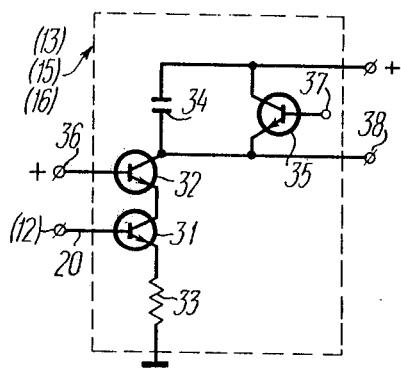
FIG. 3 is a principal diagram of a sawtooth generator with controlled rise time for the sawtooth signal, for use in an apparatus for measuring amplitude of vibration of rotating machine parts according to the invention.

The horizontal scanning unit 13, the pulse delay unit 15 at the output of the pulse former 14 and the vertical scanning unit 16 each comprises a known sawtooth generator with controlled rise time of the sawtooth signal shown in FIG. 3.

The generator of this type consists of a current generator including transistors 31 and 32 and a resistor 33, as well as a capacitor 34 and a transistor 35 operating in the gate mode. A bus bar 36, which is under a positive potential is connected to the base of the transistor 32, a bus bar 37 is connected to the base of the transistor 35, and a bus bar 38 is connected to the emitter of the transistor 35. In addition, a double differentiating circuit is connected to the output of the unit 15 (not shown).

Figure 4:
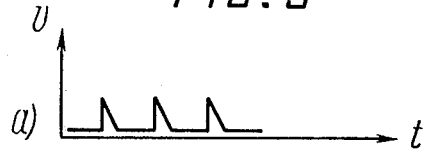
FIGS. 4a, b show time-dependent diagrams for the output signal of the sawtooth generator with controlled rise time of sawtooth signal according to the invention, wherein the diagram a — represents the delay unit and b — represents the horizontal and vertical scanning units.
Figure 4:
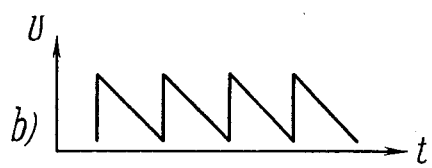

FIG. 4 shows time-dependent diagrams of the output signal voltage of sawtooth generator with of FIG. 3 a controlled rise time for the sawtooth signal for:

a — representing the operation in the delay unit 15;

b — representing the operation in the horizontal and vertical scanning units 13 and 16, respectively.

Time t is given on the abscissa and voltage U-on the ordinates.

The apparatus for measuring the amplitude of vibration of rotating machine parts according to the invention operates as follows.

During the rotation of the shaft 4 in FIG. 1 of the turbine 1, upon passage of the mark 7 by the sensor 8, the latter generates an electric pulse applied to the input of the pulse former 11. The resulting standard pulse is fed to the input of the horizontal scanning unit, and a sawtooth signal is fed from the output of this unit to the horizontal-deflection plates A of the cathode-ray tube 19 so that this signal defines a horizontal line on the screen of the cathode-ray tube 19.

During a complete revolution of the shaft 4, all the marks 6 pass by the sensor 9 which responds with an electric pulse to the passage of each mark 6. These pulses are fed, via the pulse former 14, to the input of the delay unit 15, and the delayed pulses are fed from the output thereof to the input of the vertical scanning unit 16. Sawtooth signals corresponding to respective marks 6 are fed from the output of the unit 16 to the vertical-deflection plates B of the cathode-ray tube 19, and each sawtooth signal defines a vertical line. As a result, a scan pattern is formed on the screen of the cathode-ray tube consisting of vertical lines whose number corresponds to the number of the marks 6, and hence to the number of the vanes 5.

At the instant of passage of the vibrating vanes 5 by the sensor 10, the latter generates pulses which are fed, via the pulse former 17 and the converter 18 converting the appropriately shaped pulses into short signals, to the control electrode M of the cathode-ray tube 19. Thus, brightness spots appear on the screen of the cathode-ray tube 19 whose number corresponds to the number of the vanes 5. By selecting the delay time in the unit 15, these spots are placed in respective vertical lines. Where there is no vibration, the spots appear at one and the same point of each line upon every revolution of the shaft 4 since the operation of the vertical and horizontal scanning units depends on the passage of the marks 7 and 6 by respective sensors. Upon the appearance of vibration at the vanes 5, the brightness spots will be displayed at different points in respective lines upon every revolution of the shaft to form brightness lines, the length of each displacement line being proportional to the amplitude of vibration of a given vane 5.

Upon a change in the rotational speed of the shaft 4, the frequency of pulses fed to the input of the frequency converter 12 is also changed. Thus, the pulses standardized as regards their length and amplitude are fed from the collector of the transistor 23 in FIG. 2, via the diode 28, to the input of the integrating circuit whereby a voltage proportional to the pulse frequency, that is to the rotational speed of the shaft 4 appear at the bus bar 20 in FIG. 1.

Upon a change of this voltage fed via the bus bar 20 in FIG. 3 to the base of the transistor 31 in the units 13, 15 and 16, the charging current of the capacitor 34 is also changed due to the provision of a strong feedback in the current generator including the transistors 31 and 32, the feedback comprising the stagewise configuration of the transistor circuit and the resistor 33 inserted in the emitter circuit of the transistor 31.

Therefore the charging current of the capacitor 34, and hence the speed of variation of voltage thereacross, are proportional to the rotational speed of the shaft 4 in FIG. 1.

Pulses corresponding to the marks 6 and 7 are continuously fed to the base of the transistor 35, via the bus bar 37. At the instants of application of pulses, the transistor 35 becomes conductive to discharge the capacitor 34, whereby a sawtooth signal is generated at the bus bar 38.

If a pulse is applied to the base of the transistor 35 in FIG. 3 before the potentials of the collector and base of the transistor 32 become equal, the length of the sawtooth signal at the bus bar 38 is defined by the period of the incoming pulses in FIG. 4b.

In case a pulse is applied to the base of the transistor 35 in FIG. 3 after the potentials of the collector and base of the transistor 32 have become equal, the length of the sawtooth signal is defined by the rate of charging of the capacitor 34 and the value of positive potential at the bus bar 36 of the transistor 32 in FIG. 4a. The operation modes of the horizontal scanning unit 13 are such that at the output thereof on bus bar 38 there appear the signals shown in FIG. 4b. Thus, the amplitude of the sawtooth signal is directly proportional to the rate of change in voltage across the capacitor 34 in FIG. 3 and the period of the incoming pulses. However, as it was mentioned above, the rate of voltage change is inversely proportional to this period so that the amplitude of the sawtooth signal is independent of the change in the rotational speed of the shaft 4 in FIG. 1 in a unit of time, and the magnitude of the horizontal deflection remains unchanged.

Operation modes of the delay unit 15 are such that signals shown in FIG. 4a appear at the output thereof on bus bar 38 in FIG. 3. Thus, the length of the sawtooth signal is proportional to the control voltage at the bus bar 20 in FIG. 1, and hence to the rotational speed of the shaft 4, and the delay time is equal to the length of the sawtooth signal. The delayed pulses from the output of the delay unit 15 are fed to the input of the vertical scanning unit 16 which operates in the manner similar to the above-described for the horizontal scanning unit 13 and provides for an independent amplitude of a sawtooth signal with respect to a change in the rotational speed of the shaft 4 in a unit of time. Thus, a constant vertical deflection is ensured.

As a result, a stable image is maintained on the screen of the cathode-ray tube which permits one correctly and accurately assess the vibration due to the synchronization of scanning with changes in the rotational speed of the shaft 4.

The apparatus for measuring amplitude of vibration of rotating machine parts, according to the invention, may be used where it is required to measure vibration independently of changes in the rotational speed of the shaft, in particular in turbines and compressors when measuring amplitude of vibration of the vanes thereof.

Apart from having small size and weight and being convenient in maintenance, the apparatus, according to the invention, permits one to measure amplitude of vibration directly on the screen of the cathode-ray tube graduated in units of measurement of said amplitude and to effect the recording of amplitudes using an ordinary photographic camera.

What is claimed is:

1. An apparatus for measuring the amplitude of vibration of rotating parts of machines having a stator and a shaft with marks, mounting rotating parts, comprising: a first pulse sensor sensing a first mark of said shaft of said machine, said sensor being mounted on the stator of said machine; a second pulse sensor for sensing second marks of said shaft of said machine, disposed in the same plane with said rotating parts of said machine when the latter do not vibrate, the number of said second marks corresponding to the number of said rotating parts; said second pulse sensor being mounted on said stator of said machine opposite to said second marks; a third pulse sensor for sensing said rotating parts of said machine, mounted on said stator of said machine opposite to said rotating parts; a first pulse former for appropriately shaping pulses from a sensor, having its input connected to the output of said first pulse sensor; a second pulse former for appropriately shaping pulses from a sensor, having its input connected to the output of said second pulse sensor; a third pulse sensor for appropriately shaping pulses from a sensor, having its input connected to the output of said third pulse sensor; a horizontal scanning unit comprising a sawtooth generator with controlled sawtooth risetime and having a first input connected to the output of said first pulse former, and a second input for feeding signals controlling the rise-time of sawtooth signal generated therein; a pulse delay unit at the output of said second pulse former, comprising a sawtooth generator with controlled sawtooth rise-time, having a first input connected to the output of said second pulse former, and a second input for feeding signals controlling the rise-time of a sawtooth signal generated therein; a vertical scanning unit comprising a sawtooth generator with controlled sawtooth rise-time, having a first input connected to the output of said pulse delay unit, and a second input for feeding signals controlling the rise-time of a sawtooth signal generated therein; a cathode-ray tube; horizontal-deflection plates of said cathode-ray tube connected to the output of said horizontal scanning unit; vertical-deflection plates of said cathode-ray tube connected to the output of said vertical scanning unit; a control electrode of said cathode-ray tube electrically coupled to the output of said third pulse former; a converter for converting pulse frequency into a signal proportional thereto, having its input connected to the output of said first pulse former and an output connected to said second input of said horizontal scanning unit, to said second input of said pulse delay unit and to said second input of said vertical scanning unit; a screen of said cathode-ray tube on which a scan pattern is displayed during the operation of the apparatus, the scan pattern consisting of vertical lines whose number corresponds to the number of said rotating parts, each line displaying a spot which is defined by the instant of passage of a respective one of said rotating parts by said third pulse sensor, said spot displaying a displacement line, the length of the displacement line being proportional to the amplitude of vibration of said rotating part.

* * * * *